US012400430B2

(12) United States Patent
Georgiadis et al.

(10) Patent No.: US 12,400,430 B2
(45) Date of Patent: Aug. 26, 2025

(54) SYSTEMS AND METHODS FOR NOISE AGNOSTIC FEDERATED LEARNING

(71) Applicant: JPMORGAN CHASE BANK, N.A., New York, NY (US)

(72) Inventors: Antonios Georgiadis, London (GB); Fanny Silavong, London (GB); Sean Moran, London (GB); Rob Otter, Witham (GB); Varun Babbar, Cambridge (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 370 days.

(21) Appl. No.: 17/820,119

(22) Filed: Aug. 16, 2022

(65) Prior Publication Data

US 2023/0058972 A1 Feb. 23, 2023

(51) Int. Cl.
*G06V 10/772* (2022.01)
*G06V 10/774* (2022.01)
*G06V 10/82* (2022.01)

(52) U.S. Cl.
CPC .......... *G06V 10/772* (2022.01); *G06V 10/774* (2022.01); *G06V 10/82* (2022.01)

(58) Field of Classification Search
CPC .... G06V 10/82; G06V 10/772; G06V 10/774; G06N 3/098; G06N 3/091
See application file for complete search history.

(56) References Cited

U.S. PATENT DOCUMENTS

2021/0406652 A1* 12/2021 Pogorelik ........... G06F 21/6245
2022/0391781 A1* 12/2022 Litany .................... G06N 3/098
2022/0398500 A1* 12/2022 Singhal .................. G06N 3/098
2023/0177349 A1* 6/2023 Balakrishnan .......... H04L 67/10
706/25

FOREIGN PATENT DOCUMENTS

WO WO-2022019885 A1 * 1/2022 ............. G06N 3/045

OTHER PUBLICATIONS

Fan, Chenyou; et al., "Federated Generative Adversarial Learning", Shenzhen Institute of Artificial Intelligence and Robotics for Society (AIRS), China; Jul. 19, 2020.

* cited by examiner

*Primary Examiner* — Margaret G Webb
(74) *Attorney, Agent, or Firm* — GREENBERG TRAURIG LLP

(57) ABSTRACT

Systems and methods for noise agnostic federated learning are disclosed. A method may include a client computer program executed by an electronic device in a federated learning computer network comprising a plurality of clients: receiving, from a federated learning computer program, a data format having desirable noise characteristics; transforming a client data set comprising variable noise characteristics to the data format using a client generative adversarial network (GAN); generating client weights for the transformed client data set, wherein the client weights indicate features of the client data set; communicating the client weights to the federated learning computer program; receiving, from the federated learning computer program, adjusted weights, wherein the adjusted weights are based on the client weights and a plurality client weights received from the clients in the federated learning computer network; and updating the client weights for a client machine learning model using the adjusted weights.

20 Claims, 5 Drawing Sheets

SYSTEMS AND METHODS FOR NOISE AGNOSTIC FEDERATED LEARNING

RELATED APPLICATIONS

This application claims priority to, and the benefit of, Greek Patent Application Number 20210100555, filed Aug. 17, 2021, the disclosure of which is hereby incorporated, by reference, in its entirety.

BACKGROUND OF THE INVENTION

1. Field of the Invention

Embodiments are generally related to systems and methods for noise agnostic federated learning.

2. Description of the Related Art

Federated learning presents challenges when the clients each have different noise environments. Conventional models require client models to train independently and share weights with a centralized server. This presents deviations in the accuracy of the weights because of variances in the noise which results in an undesirable Federated Learning model.

SUMMARY OF THE INVENTION

Systems and methods for noise agnostic federated learning are disclosed. In embodiments, the method may include receiving, by a client network, a data format. The method may further include mapping, by a generative adversarial network, a client data set to the data format to form a transformed data set. The method may further include learning a set of weights for the transformed data set. The method may further include communicating the set of weights to a federated learning computer program. The method may further include receiving an adjusted set of weights from the federated learning computer program.

According to one embodiment, a method for noise agnostic federated learning may include: (1) a client computer program executed by an electronic device in a federated learning computer network comprising a plurality of clients receiving, from a federated learning computer program, a data format having desirable noise characteristics, wherein the data format is broadcast to all clients in the federated learning computer network; (2) transforming, by the client computer program, a client data set comprising variable noise characteristics to the data format using a client generative adversarial network (GAN); (3) generating, by the client computer program, client weights for the transformed client data set, wherein the client weights indicate features of the client data set; (4) communicating, by the client computer program, the client weights to the federated learning computer program; (5) receiving, by the client computer program and from the federated learning computer program, adjusted weights, wherein the adjusted weights are based on the client weights and a plurality client weights received from the clients in the federated learning computer network; and (6) updating, by the client computer program, the client weights for a client machine learning model using the adjusted weights.

In one embodiment, the client data set may include a plurality of images, audio data, etc.

In one embodiment, the client GAN may be specific to the client, may be used by all clients in the federated learning computer network, etc.

In one embodiment, the client GAN may transform the client data by performing an unpaired transformation on each of the images in the client data set using the data format.

In one embodiment, the federated learning computer program may be configured to aggregate the client weights and the plurality of client weights.

In one embodiment, the client computer program may update the client weights by replacing the client weights with the adjusted weights. In another embodiment, the client computer program may update the client weights based on the adjusted weights.

According to another embodiment, a system may include an electronic device in a federated learning computer network executing a federated learning computer program and plurality of client networks in the federated learning computer network, each client network comprising a client generative adversarial network (GAN), a client data set having variable noise characteristics, and a client machine learning model. The federated learning computer program may send each of the plurality of client networks in a federated learning computer network, a data format having desirable noise characteristics. Each client network may transform its client data set comprising variable noise characteristics to the data format using a client generative adversarial network (GAN); may generate client weights for the transformed client data set, wherein the client weights indicate features of the client data set; and may communicate its client weights to the federated learning computer program. The federated learning computer program may generate adjusted weights from the client weights and may communicate the adjusted weights to each of the plurality of client networks. Each client network may update its client weights for its client machine learning model using the adjusted weights.

In one embodiment, each client data set may include a plurality of images, audio data, etc.

In one embodiment, each of the client GANs may be specific to each client network. In another embodiment, the client networks use the same client GAN.

In one embodiment, each of the client GANs may transform its client data by performing an unpaired transformation on each of the images in its client data set using the data format.

In one embodiment, the federated learning computer program may aggregate the plurality of client weights.

In one embodiment, each of the client networks may update its client weight by replacing its client weight with the adjusted weights.

In one embodiment, each of the client networks may update its client weight by adjusting its client weights based on the adjusted weights.

According to another embodiment, a non-transitory computer readable storage medium, including instructions stored thereon, which when read and executed by one or more computer processors, cause the one or more computer processors to perform steps comprising: receiving, from a federated learning computer program, a data format having desirable noise characteristics, wherein the data format is broadcast to all clients in a federated learning computer network; transforming a client data set comprising variable noise characteristics to the data format using a client generative adversarial network (GAN); generating client weights for the transformed client data set, wherein the client weights indicate features of the client data set; communicating the client weights to the federated learning computer program; receiving, from the federated learning computer program, adjusted weights, wherein the adjusted weights are based on the client weights and a plurality client weights received from the clients in the federated learning computer network; and updating the client weights for a client machine learning model using the adjusted weights.

In one embodiment, the client GAN may be specific to a client.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for noise agnostic federated learning. For example, embodiments may leverage the use of multiple machine learning models, a federated learning computer program, and various client networks. Embodiments may address issues relating to federated machine learning with client environments that have variations in the noise of a client data set by leveraging generative adversarial networks (GANs).

A GAN may be a machine learning model for performing unpaired data transformation. While described in the context of a cycle GAN, other types of GANs or machine learning models for unpaired data transformation may also be used.

Embodiments may use client specific GANs that are specific to a client, or they may use a universal GAN that may apply to a plurality of clients. The universal GAN may be used, for example, if a client does not have available processing power to use a client-specific GAN.

Although embodiments may be described in the context of image processing, it should be recognized that the disclosure is not so limited and has applicability to other types of data, including audio data. In another embodiment, if converted to a format that a GAN can transform, such as embeddings or featurization, tabular and textual data may also be used.

Figure 1:
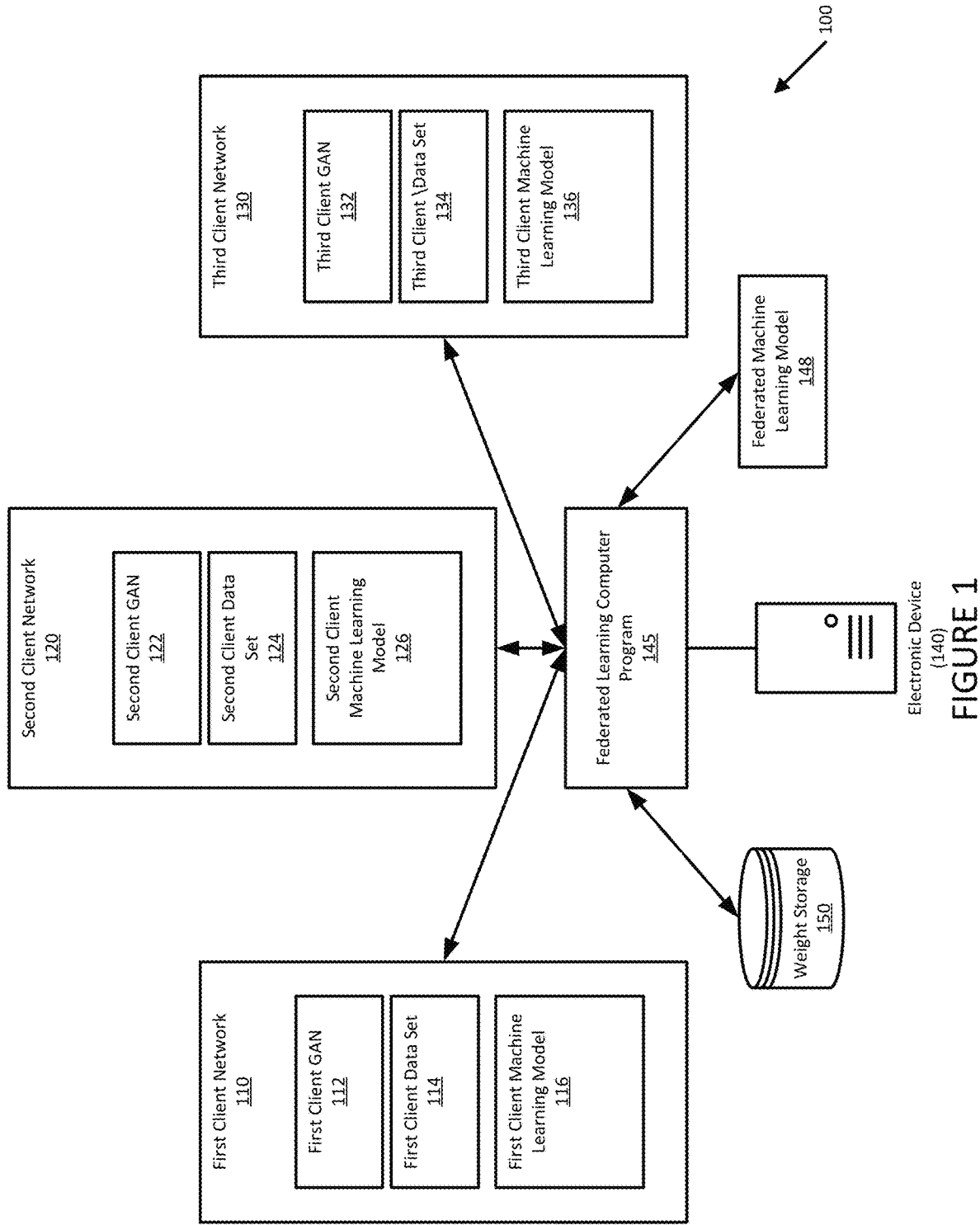
FIG. 1 depicts a system for noise agnostic federated learning, according to certain embodiments of the present disclosure.

FIG. 1 depicts a system for noise agnostic federated learning according to an embodiment. System 100 may include a plurality of client networks, such as first client network 110, second client network 120, and third client network 130. Additional or fewer client networks may be provided as is necessary and/or desired.

Each client network 110, 120, 130 may include a client-specific GAN (e.g., first client GAN 112, second client GAN 122, third client GAN 132), a client data set (e.g., first client data set 114, second client data set 124, third client data set 134), and a client machine learning model (e.g., (e.g., first machine learning model 116, second machine learning model 126, third machine learning model 136). Each client network 110, 120, 130 may interface with federated learning computer program 145 that may be executed by electronic device 140, such as a server (e.g., physical and/or cloud-based), computers (e.g., workstations, desktops, laptops, etc.).

As noted above, client networks 110, 120, 130 may use a universal GAN as is necessary and/or desired.

Federated learning computer program 145 may further store weights for a federated model in weight storage 150.

Federated learning computer program 145 may distribute a data format to each of first client network 110, second client network 120, and/or third client network 130. The data format may be a format that is set by federated learning computer program 145, or it may be updated during operation. For example, the data format may be an example image that includes attributes such as a brightness, a contrast, or other features that are desirable for use by the federated learning model (e.g., a desired noise).

First client network 110 may be a computing network that may include one or more computing devices (not shown), first client GAN 112, first client data set 114, and first machine learning model 116. First machine learning model 116 may be associated with first client data set 114 and a noise characteristic. The noise characteristic may be a variability in first client data 114, such as image noise that is specific to first client data set 114. For example, first client data set 114 may contain images that are noisy with regards to luminance, contrast, or colors.

Figure 4:
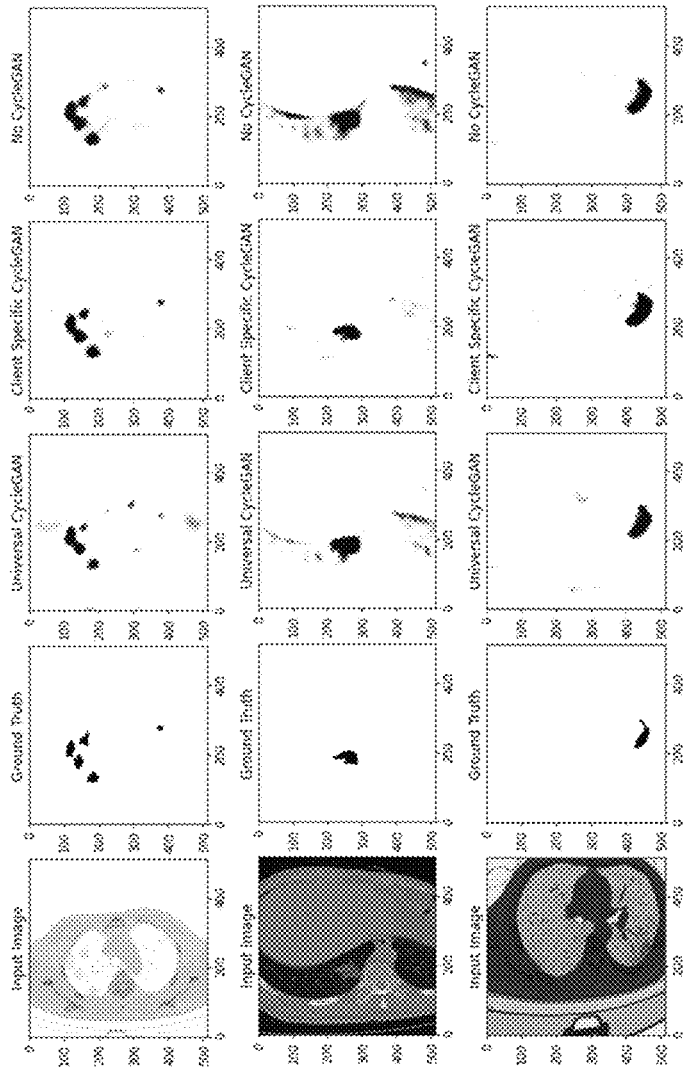
FIG. 4 depicts an example of image comparison between various GAN implementations, according to certain embodiments of the present disclosure.

First client GAN 112 may be a cycle GAN that performs unpaired image translation from a plurality of images in first client data set 114 to an image in the data format. For example, first client GAN 112 may transform a noisy image in first client data set 114 into an image that conforms to the noise of the data format. A visual example is depicted in FIG. 4.

First machine learning model 116 may learn a plurality of sets of weights based on the output of first client GAN 112. For example, first machine learning model 116 may receive the transformed data set from first client GAN 112. First machine learning model 116 may communicate the weights to federated learning computer program 145.

Second client network 120 may be a computing network that may include one or more computing devices (not shown), second client GAN 122, second client data set 124, and second machine learning model 126. Second machine learning model 126 may be associated with second client data set 124 and a noise characteristic. The noise characteristic may be a variability in second client data 124, such as image noise that is specific to second client data set 124. For example, second client data set 124 may contain images that are noisy. Second client GAN 122 may be a cycle GAN that performs unpaired image translation from a plurality of images in second client data set 124 to an image in the data format. Second client GAN 124 may transform a noisy image of second client data set 124 into an image that conforms to the noise of the data format.

Second machine learning model 126 may learn a plurality of sets of weights based on the output of second client GAN 122. For example, second machine learning model 126 may receive the transformed data set from second client GAN 122. Second machine learning model 126 may communicate the weights to federated learning computer program 145.

Third client network 130 may be a computing network that may include one or more computing devices (not shown), third client GAN 132, third client data set 134, and third machine learning model 136. Third machine learning model 136 may be associated with third client data set 134 and a noise characteristic. The noise characteristic may be a variability in third client data set 134, such as image noise that is specific to third client data set 134. For example, third client data set 134 may contain images that are noisy. Third client GAN 132 may be a cycle GAN that performs unpaired image translation from a plurality of images in third client data set 134 to an image in the data format. Third client GAN 134 may transform a noisy image of third client data set 134 into an image that conforms to the noise of the data format.

Third machine learning model 136 may learn a plurality of sets of weights based on the output of third client GAN 132. For example, third machine learning model 136 may receive the transformed data set from third client GAN 132. Third machine learning model 136 may communicate the weights to federated learning computer program 145.

Federated learning computer program 145 may communicate with multiple client networks (e.g., first client network 110, second client network 120, third client network 130). Federated learning computer program 145 may communicate federated machine learning model 148 for use by first client network 110, second client network 120, and/or third client network 130 to perform local machine learning. Federated learning computer program 145 may further be configured to receive a weights from each of the client networks. Federated learning computer program 145 may store the sets of weights in weight storage 150.

Federated learning computer program 145 may be further configured to communicate adjusted weights to first client network 110, second client network 120, and/or third client network 130. Federated learning computer program 145 may adjust the sets of weights such as by performing an average of the sets of weights received. In other examples, the adjustment may be made based on an average of gradients.

Weight storage 150 may be a data structure to store parameters of one or more machine learning models. For example, weight storage 150 may store weights with metadata identifying the machine learning model or client network to which the weights correspond. For instance, first weights (i.e., machine learning parameters) may apply to first machine learning model 116.

Weight storage 150 may partition the data structure to store weights associated with different machine learning models in separate partitions.

While FIG. 1 is described with each client having a client specific GAN, other configurations, such as a single GAN for all of the client networks, may also be used. In further configurations, the client networks may be grouped or clustered based on a similarity of the noise in data sets on two or more client networks. In this configuration, GANs may be specific for one or more client data sets and may be specific for each client data, or groups of client data sets up to and including all client data sets.

Figure 2:
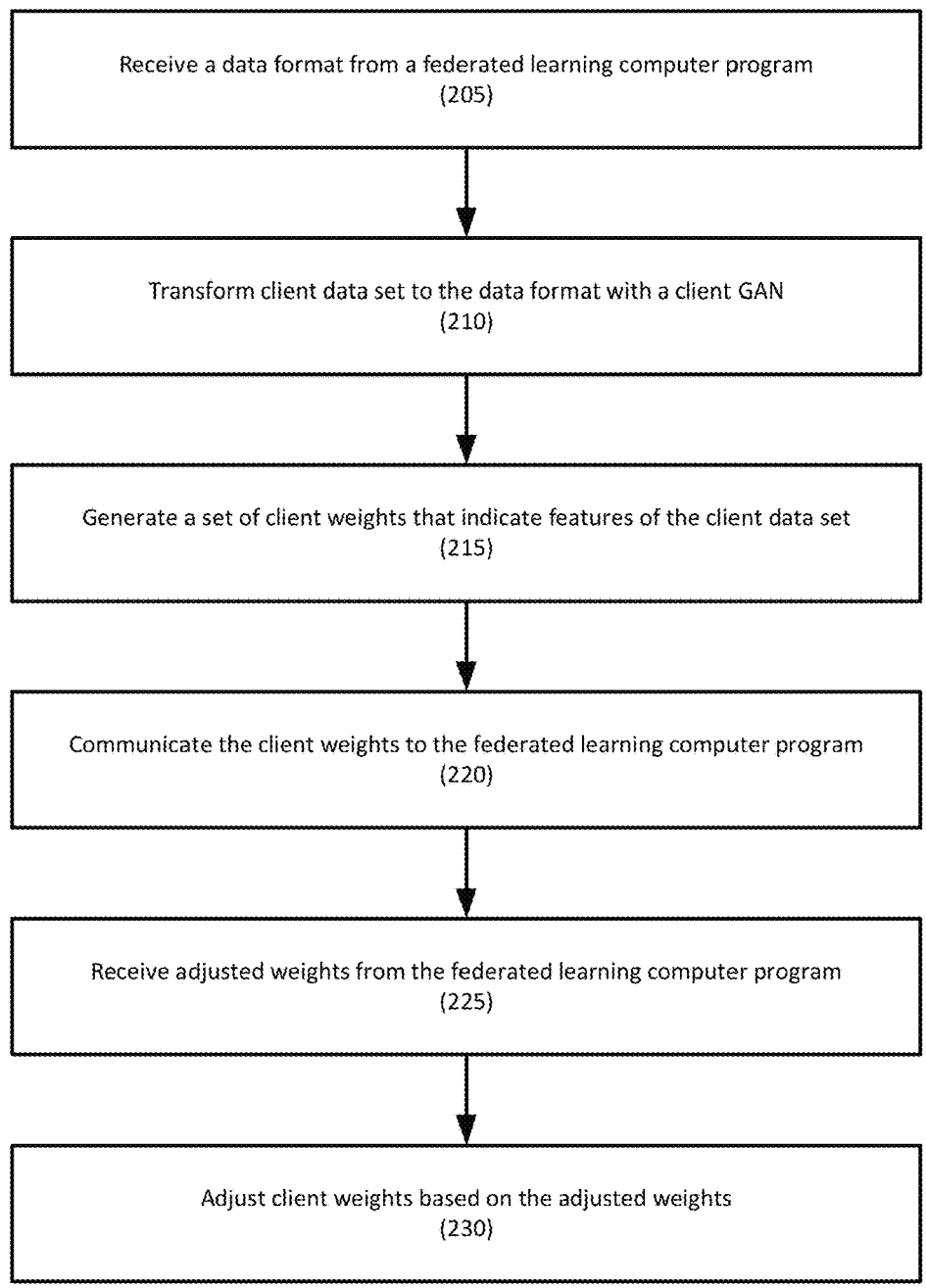
FIG. 2 depicts a method for noise agnostic federated learning, according to certain embodiments of the present disclosure.

FIG. 2 depicts a method for noise agnostic federated learning according to an embodiment.

In step 205, a federated learning computer program executed by an electronic device may communicate a data format to one or more client networks. For example, the federated learning computer program may broadcast the data format (e.g., an image) to the client network(s). The data format may include data that have desirable noise characteristics or features. For example, in one embodiment, the data format may include one or more datapoints set to a noise characteristic for the client networks to map toward.

In another embodiment, the data format may include a featurized version of the desired noise characteristic. For example, the data format may include a mid-layer representation of the noisy data after it is passed through an autoencoder neural network.

In step 210, each client network may transform a client data set to the data format using a client GAN. For example, the client data set may include a plurality of images with variable noise characteristics. The client GAN may perform an unpaired transformation on each of the images in the client data set using the received data format. An example of the transformation is illustrated in FIG. 5.

Figure 5:
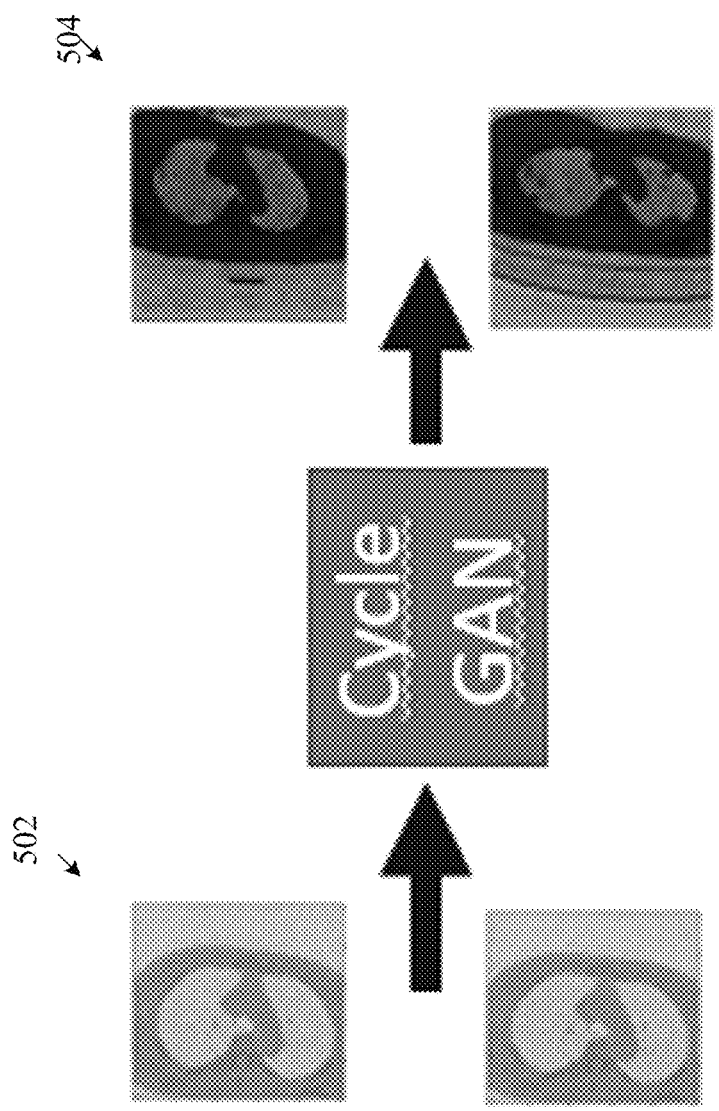
FIG. 5 depicts a client GAN transformation of a selected image of the client data set to a transformed image.

FIG. 5 depicts a client cycle GAN transformation of a selected image 502 of the client data set to a transformed image 504. The client cycle GAN uses the data format provided by the federated learning computer program to perform the transformation.

Referring again to FIG. 2, in step 215, each client network may generate respective client weights that indicate features of the client data set. For example, in image processing, each client machine learning model may identify objects in an image, such as lesions in a CT scan. Each machine learning model may use the transformed data set from the respective cycle GAN to learn weights for segmenting the images.

In step 220, each client network may communicate its weights to the federated learning computer program. For example, the client networks may communicate encrypted tokens and the weights using TCP/IP, HTTP, a virtual private network, SSH, or other suitable means for communication between the client network and the federated learning computer program.

In step 225, the federated learning computer program may generate adjusted weights based on the weights received from the client networks. For example, the federated learning computer program may aggregate the weights into consolidated client weights. The federated learning computer program may perform the aggregation by computing an average, a weighted average, or the like on the sets of client weights. In some examples, the weights may be represented by gradients, weight changes, or raw weight values.

The federated learning computer program may then communicate the adjusted weights using TCP/IP, HTTP, a virtual private network, SSH, or other suitable means for communication, to the clients.

In step 230, each client may update its weights using the adjusted weights. For example, each client may replace its client weights with the adjusted weights, may adjust the client weights based on the adjusted weights (e.g., nudging the client weights in one direction), etc.

Figure 3:
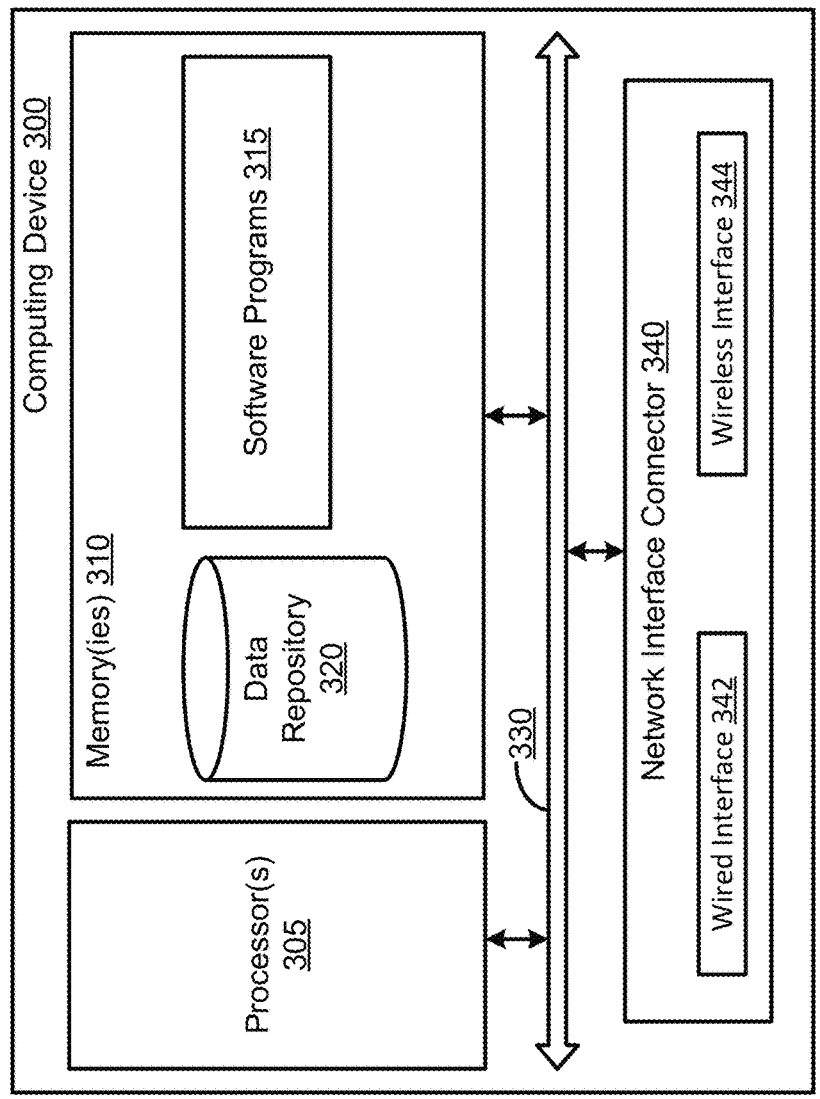
FIG. 3 depicts an example of computing device for implementing the system, according to certain embodiments of the present disclosure.

FIG. 3 depicts an example of computing device 300 according to certain embodiments of the present disclosure. FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

FIG. 4 depicts an example of an image segmentation comparison between various federated learning frameworks with different GAN preprocessing implementations, according to certain embodiments of the present disclosure. FIG. 4 depicts three clients with three input images (e.g., in the client data set with a noise characteristic). As clearly shown in FIG. 4, the input images are prior to being transformed by a GAN as described above. FIG. 4 depicts ground truth images of the areas of interest for the segmentation task for each input image and also depicts an output based on multiple GAN configurations.

In this example, each row represents a different example datapoint to demonstrate the differences in noise patterns. In this example, each client has data having a different noise pattern. In FIG. 4, the left image is the original CT scan, while the right is the segmentation "masks" (i.e., where the area of interest is in the original scan) of an aggregator trained with three clients, between different federated learning implementations. The approached are a universal GAN that uses one GAN shared across all clients, one at uses a client-specific GAN with one GAN per client and the non-GAN federated learning version (rightmost) for comparison.

The disclosure of Antonios Georgiadis, Varun Babbar, Fran Silavong, Sean Moran, and Rob Otter, "ST-FL: style transfer preprocessing in federated learning for COVID-19 segmentation," Proc. SPIE 12037, Medical Imaging 2022: Imaging Informatics for Healthcare, Research, and Applications, 1203704 (4 Apr. 2022), available at doi.org/10.1117/12.2611096, is hereby incorporated by reference in its entirety.

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for noise agnostic federated learning comprising:
   a client computer program executed by an electronic device in a federated learning computer network comprising a plurality of clients receiving, from a federated learning computer program, a data format having desirable noise characteristics, wherein the data format is broadcast to all clients in the federated learning computer network;
   transforming, by the client computer program, a client data set comprising variable noise characteristics to the data format using a client generative adversarial network (GAN);
   generating, by the client computer program, client weights for the transformed client data set, wherein the client weights indicate features of the client data set;
   communicating, by the client computer program, the client weights to the federated learning computer program;

receiving, by the client computer program and from the federated learning computer program, adjusted weights, wherein the adjusted weights are based on the client weights and a plurality client weights received from the clients in the federated learning computer network; and updating, by the client computer program, the client weights for a client machine learning model using the adjusted weights.

2. The method of claim 1, wherein the client data set comprises a plurality of images.

3. The method of claim 1, wherein the client data set comprises audio data.

4. The method of claim 1, wherein the client GAN is specific to the client.

5. The method of claim 1, wherein the client GAN is used by all clients in the federated learning computer network.

6. The method of claim 2, wherein the client GAN transforms the client data by performing an unpaired transformation on each of the images in the client data set using the data format.

7. The method of claim 1, wherein the federated learning computer program is configured to aggregate the client weights and the plurality of client weights.

8. The method of claim 1, wherein the client computer program updates the client weights by replacing the client weights with the adjusted weights.

9. The method of claim 1, wherein the client computer program updates the client weights by adjusting the client weights based on the adjusted weights.

10. A system, comprising:
an electronic device in a federated learning computer network executing a federated learning computer program; and
a plurality of client networks in the federated learning computer network, each client network comprising a client generative adversarial network (GAN), a client data set having variable noise characteristics, and a client machine learning model;
wherein:
the federated learning computer program sends each of the plurality of client networks in a federated learning computer network, a data format having desirable noise characteristics;
each client network transforms its client data set comprising variable noise characteristics to the data format using a client generative adversarial network (GAN);
each client network generates client weights for the transformed client data set, wherein the client weights indicate features of the client data set;
each client network communicates its client weights to the federated learning computer program;
the federated learning computer program generates adjusted weights from the client weights;
the federated learning computer program communicates the adjusted weights to each of the plurality of client networks;
each client network updates its client weights for its client machine learning model using the adjusted weights.

11. The system of claim 10, wherein each client data set comprises a plurality of images.

12. The system of claim 10, wherein each client data set comprises audio data.

13. The system of claim 10, wherein each of the client GANs is specific to each client network.

14. The system of claim 10, the client networks use the same client GAN.

15. The system of claim 11, wherein each of the client GANs transforms its client data by performing an unpaired transformation on each of the images in its client data set using the data format.

16. The system of claim 10, wherein the federated learning computer program aggregates the plurality of client weights.

17. The system of claim 10, wherein each of the client networks updates its client weight by replacing its client weight with the adjusted weights.

18. The system of claim 10, wherein each of the client networks updates its client weight by adjusting its client weights based on the adjusted weights.

19. A non-transitory computer readable storage medium, including instructions stored thereon, which when read and executed by one or more computer processors, cause the one or more computer processors to perform steps comprising:
receiving, from a federated learning computer program, a data format having desirable noise characteristics, wherein the data format is broadcast to all clients in a federated learning computer network;
transforming a client data set comprising variable noise characteristics to the data format using a client generative adversarial network (GAN);
generating client weights for the transformed client data set, wherein the client weights indicate features of the client data set;
communicating the client weights to the federated learning computer program;
receiving, from the federated learning computer program, adjusted weights, wherein the adjusted weights are based on the client weights and a plurality client weights received from the clients in the federated learning computer network; and
updating the client weights for a client machine learning model using the adjusted weights.

20. The non-transitory computer readable storage medium of claim 19, wherein the client GAN is specific to a client.

* * * * *

UNITED STATES PATENT AND TRADEMARK OFFICE
CERTIFICATE OF CORRECTION

| | | |
|---|---|---|
| PATENT NO. | : 12,400,430 B2 | Page 1 of 1 |
| APPLICATION NO. | : 17/820119 | |
| DATED | : August 26, 2025 | |
| INVENTOR(S) | : Antonios Georgiadis et al. | |

It is certified that error appears in the above-identified patent and that said Letters Patent is hereby corrected as shown below:

On the Title Page

After (65) Prior Publication Data, add item (30), the following header and data:
--(30) Foreign Application Priority Data
August 17, 2021 (GR) ………………………. 20210100555--

Signed and Sealed this
Thirtieth Day of September, 2025

John A. Squires
*Director of the United States Patent and Trademark Office*